E. M. BENTON.
MEAT CUTTING MACHINE.
APPLICATION FILED DEC. 14, 1916.
1,255,978.
Patented Feb. 12, 1918.
4 SHEETS—SHEET 1.
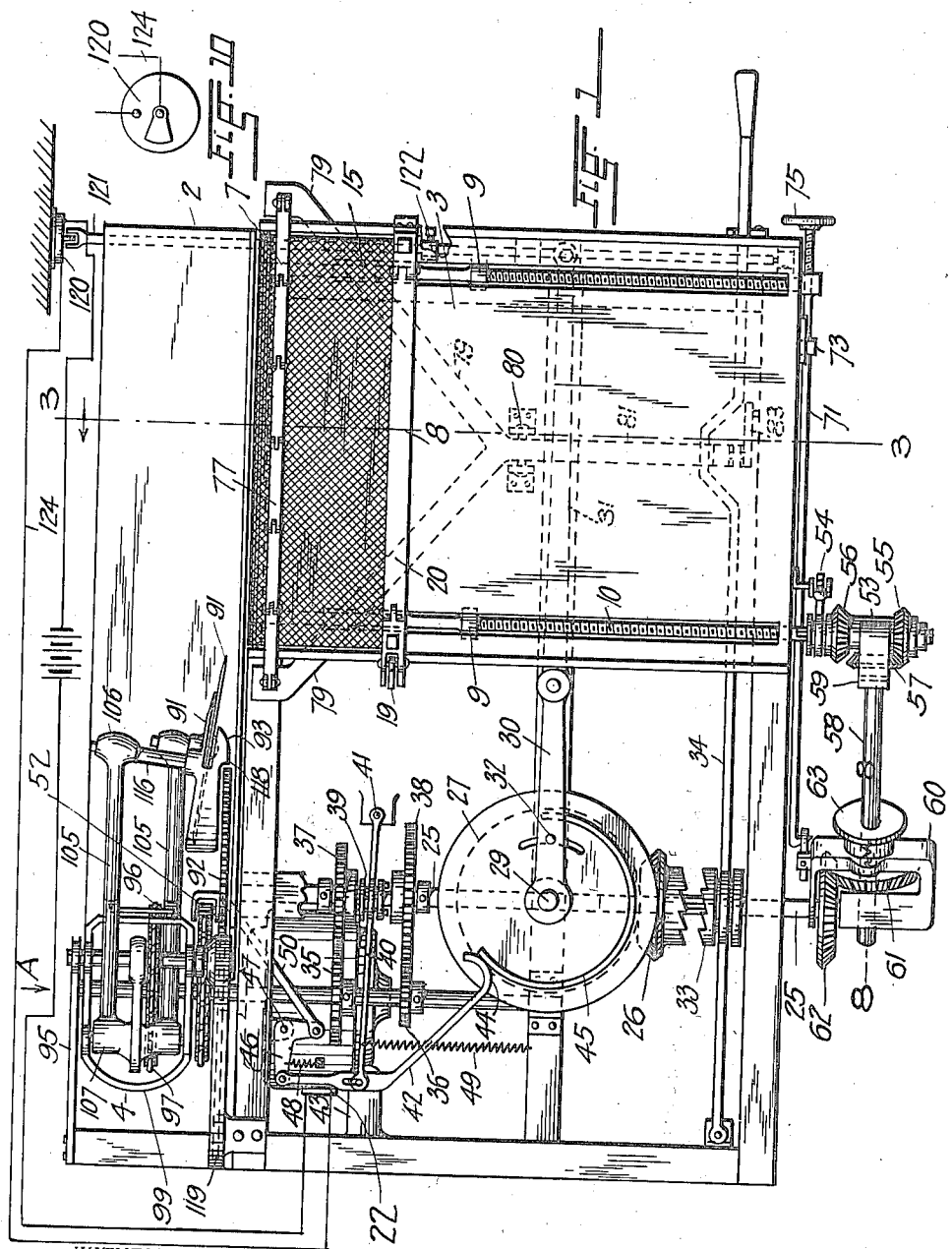
WITNESS:
INVENTOR.
E. M. BENTON.
BY
ATTORNEY.

E. M. BENTON.
MEAT CUTTING MACHINE.
APPLICATION FILED DEC. 14, 1916.
1,255,978.
Patented Feb. 12, 1918.
4 SHEETS—SHEET 2.
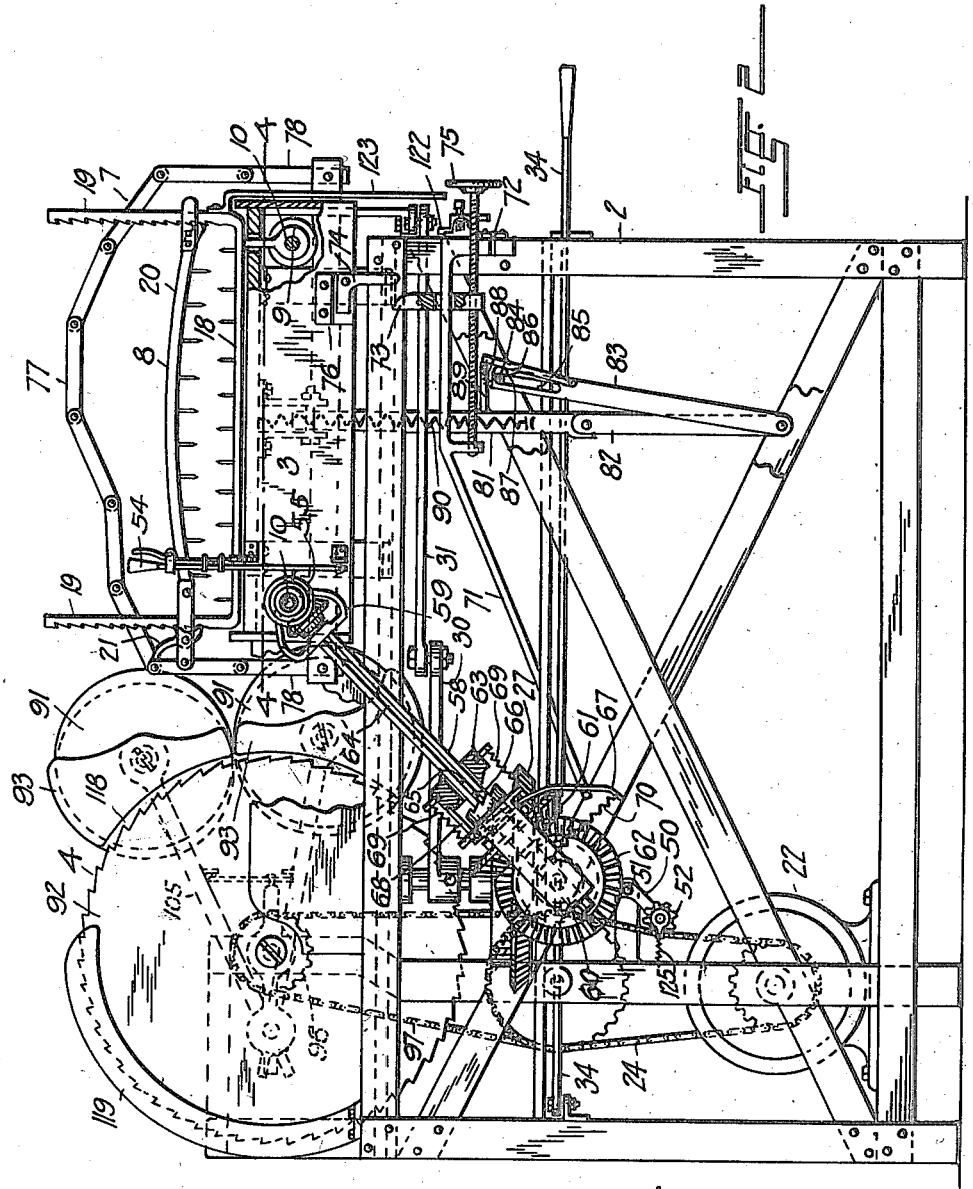
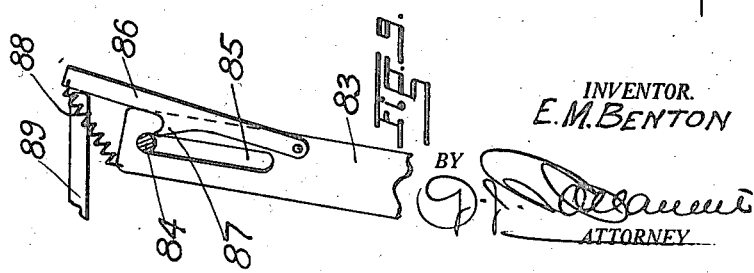
WITNESS:
INVENTOR.
E. M. BENTON
BY
ATTORNEY

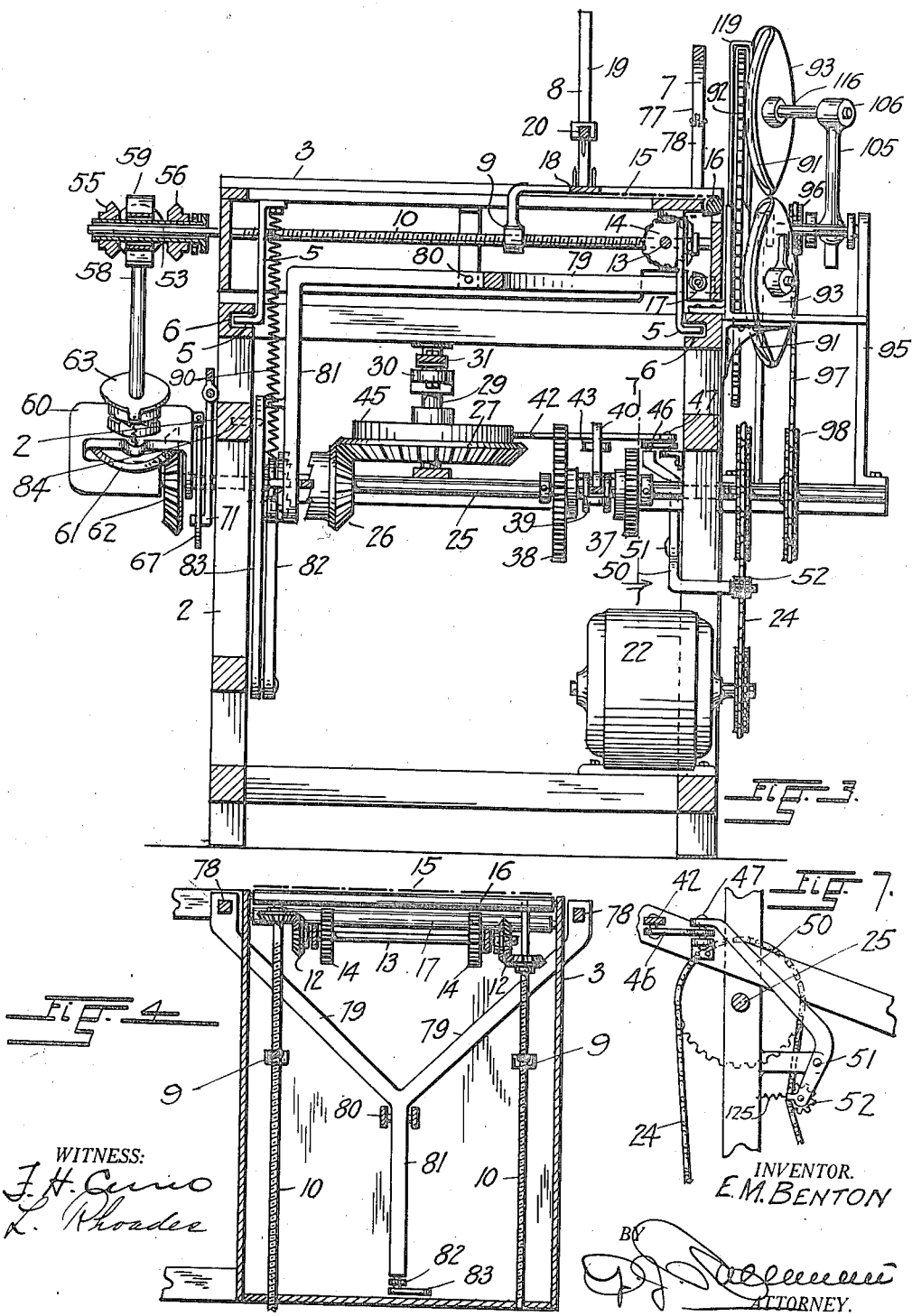

E. M. BENTON.
MEAT CUTTING MACHINE.
APPLICATION FILED DEC. 14, 1916.
1,255,978.
Patented Feb. 12, 1918.
4 SHEETS—SHEET 4.
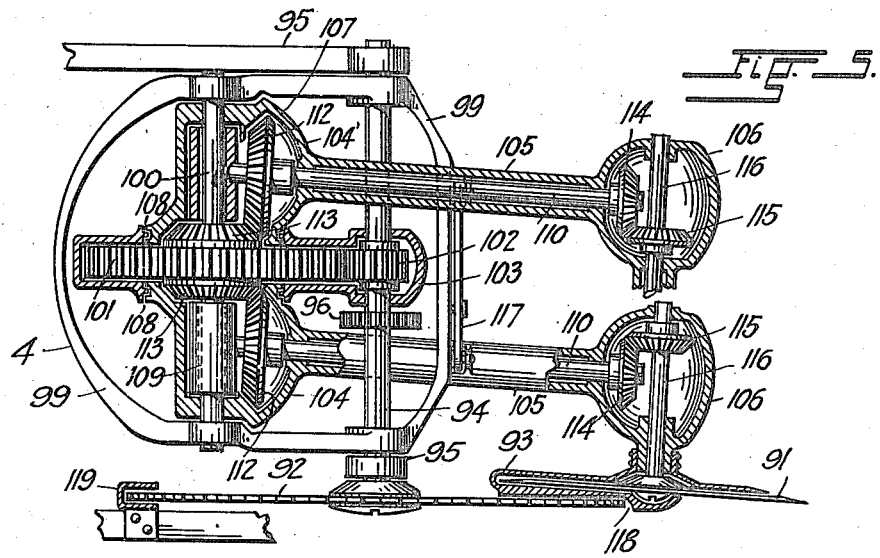
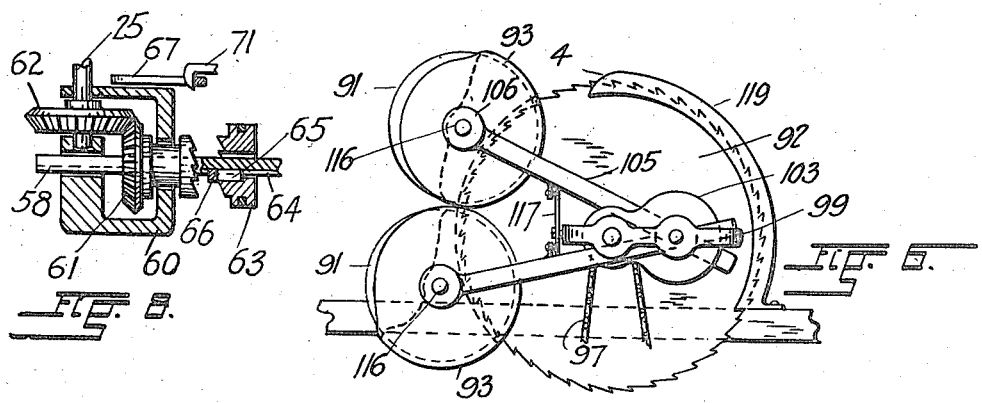
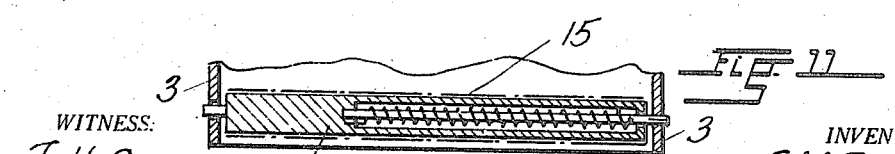
WITNESS:
INVENTOR.
E. M. BENTON.
BY
ATTORNEY.

UNITED STATES PATENT OFFICE.

EARL M. BENTON, OF CHEYENNE, WYOMING, ASSIGNOR OF ONE-FOURTH TO EVERETT J. LIPPARD AND ONE-FOURTH TO W. H. ANDREW, BOTH OF CHEYENNE, WYOMING.

MEAT-CUTTING MACHINE.

1,255,978.

Specification of Letters Patent.

Patented Feb. 12, 1918.

Application filed December 14, 1916. Serial No. 136,954.

*To all whom it may concern:*

Be it known that I, EARL M. BENTON, a citizen of the United States, residing at Cheyenne, in the county of Laramie and State of Wyoming, have invented certain new and useful Improvements in Meat-Cutting Machines, of which the following is a specification.

This invention relates to meat cutting machines and more particularly to machines of the type shown and described in my United States Letters-Patent No. 1,130,248, issued March 2, 1915.

The object of the present invention is to provide certain improvements which render the original machine disclosed in the patent, more positive and reliable in its operation and which provide for the automatic action of all of its parts that coöperate to cut a joint of meat into slices of any desired thickness.

With these objects in view my invention comprises a cutting element the members of which are adapted to cut readily through the meat and bone of a piece fed toward them, irrespective of the size and shape of the joint or the position and thickness of the bone thereof.

The cutting members are arranged so that those provided to slice the meat, perform their function without coming in contact with the bone which is cut by a separate member coöperatively associated with the others.

A reciprocating carriage moves the meat into engagement with the cutting element at a uniform rate of speed and after the operation of the latter by which a slice of meat of the desired thickness is severed from the joint, has been completed, returns the carriage to its original position at an increased velocity.

The meat is held upon the carriage by clamping appliances which after each slice has been severed from the joint, automatically releases the same for the operation of a feed mechanism which at a predetermined point in the movement of the carriage, automatically advances the joint a distance equal to the thickness of the slices into which it is being divided.

After a piece of meat has been sliced, the parts of the machine comprised in the feed mechanism are returned to their original position by a manual adjustment which together with a clutch which controls the operative connection of the moving parts of the machine with a motor or other motive agent provided for their operation, are the only parts of the apparatus which do not perform their functions automatically.

In case of an increased resistance to the action of the cutting element by the presence of a foreign substance, or other cause, the operation of the machine is automatically discontinued until the obstacle has been removed, and a simple adjustment is provided to automatically stop the machine at any desired point in the movement of its feed-mechanism to discontinue the operation after a determinate portion of a piece of meat has been sliced.

The mechanism for operating the cutting element of my improved machine, moves in a lubricant to minimize friction and wear, and the cutting instruments of the element automatically position themselves without prior manual adjustment, to properly perform their respective functions, irrespective of the size or shape of the joint of meat to be cut, or the position of the bone therein.

An illustrative embodiment of my invention has been shown in the accompanying drawings in the various views of which like parts are similarly designated, and in which—

Figure 1 is a plan view of my improved meat-cutting machine,

Fig. 2, a side elevation of the same,

Fig. 3, a transverse section taken along the line 3—3, Fig. 1,

Fig. 4, a fragmentary horizontal section on the line 4—4, Fig. 2,

Fig. 5, an enlarged plan view of the cutting-element of the machine with the casing in which its operative parts are inclosed, shown partially in section, Fig. 6, a side elevation of the cutting element of the machine, looking in the direction of the arrow A, Fig. 1, Fig. 7, a section taken along the line 7—7, Fig. 3, Fig. 8, a section on the line 8—8, Fig. 1, Fig. 9, an enlarged view of an end of the folding bar forming part of the clamp adjustment, and adjacent parts, Fig. 10, a face view of an electric switch included in the mechanism provided to automatically discontinue the operation of the machine, and Fig. 11, a longitudinal section through the tension-roller upon which the flexible belt of the feed-mechanism is wound.

Referring more specifically to the drawings wherein like reference characters designate corresponding parts throughout the several views, the numeral 2 denotes a suitable supporting structure made in the form of a bench or table upon which the operating parts of the machine are coöperatively assembled.

A carriage 3 upon which in the operation of the machine the piece of meat is supported, is mounted for rectilinear reciprocation upon the table 2 to carry the meat at regular intervals into contact with the cutting appliance which in its entirety is designated by the numeral 4.

The carriage consists in its preferred form of a rectangular frame provided with a plurality of legs 5 which at their lower ends have outwardly bent feet slidingly disposed in parallel guide-grooves 6 formed in the longitudinal side members of the deck or top of the table 2.

The carriage carries two clamping devices 7 and 8 which conjointly secure the joint of meat. The clamping device 7 has a fixed position with relation to the carriage, while the other device 8 is part of a feeding mechanism which automatically advances a joint of meat after each operation of the cutting element, a distance which may be varied in accordance with the thickness of the slice.

The clamp 8 is to this end supported by means of nuts 9 upon two parallel, rotary feed screws 10 which extend transversely of the carriage with relation to the direction of its reciprocating movement.

The two feed-screws are connected to rotate in unison by means of two pairs of beveled gears 12 the correlatives of which are mounted respectively upon the screws 10 and upon a cross shaft 13 rotatably supported on the carriage. The last mentioned shaft carries two sprocket wheels 14 to impellently engage a belt 15 made of wire-netting or other suitable fabric which at its forward end is attached to the clamp 8.

The belt is bent around the end of the carriage upon an antifriction roller 16 and is partially wound upon a tension roller 17 which tends to wind it for movement in a direction opposite to the forward motion of the clamp along the feed-screws.

The clamp 8 consists in its preferred form of a body member to which the nuts 9 and the belt 15 are secured and which is composed of a cross part 18 and two upright parts 19 provided with series of ratchet teeth for the connection of the adjustable member 20 of the clamp.

The last-mentioned member consists of a bar which is vertically movably mounted upon the uprights of the other member and which is held in engagement with the ratchet teeth of the same by a detent at one of its ends and an adjustable dog 21 at its other end.

The member 20 of the clamp and the transverse part 18 of the relatively stationary member of the same are provided with oppositely pointing prongs for engagement with a piece of meat supported upon the belt which in the operation of the machine constitutes a carrier to move the joint intermittently in a direction transverse to that in which it moves with the carriage toward and from the cutting appliance.

The carriage receives its reciprocating movement from an electric motor 22 through the instrumentality of a transmission mechanism which includes means to automatically change the velocity of the carriage at determinate moments in its reciprocating movement whereby to accelerate the return movement of the carriage relative to its comparatively slower effective movement.

The transmission mechanism above referred to receives its movement from a line shaft 23 which is connected with the electric motor by a sprocket chain 24. The line-shaft imparts in the operation of the machine, a rotary movement to a counter-shaft 25 through the medium of a change-speed gearing which serves to periodically vary the angular velocity of the counter shaft in ratio to the constantly uniform movement of the line-shaft.

A beveled gear 26 on the shaft 25 meshes with a corresponding gear 27 of larger diameter on a vertical shaft 29 which by its rotary motion imparts a reciprocating movement to the carriage through the instrumentality of a crank 30 and a connecting rod 31. The crank is loose on the upright shaft 29 and carries a pin 32 which extends through a segmental slot in the gear-wheel 27, a construction which permits of the crank passing its dead center positions without strain upon the parts with which it is connected.

The rotative continuity between the shaft 25 and the bevel gear-wheel 26 which is loosely mounted thereon, is established by a toothed clutch 33 which slides along a feather on the shaft to engage corresponding teeth on the hub of the gear 26, a lever 34 being provided to manually move the clutch into and out of engagement with the gear wheel.

The change-speed gearing above referred to, consists of two gear-wheels 35 and 36 of different diameters which are mounted on the line shaft and which are continuously in mesh with gear-wheels 37 and 38 loosely mounted on the countershaft 25.

A double-faced clutch 39 having a movement along a feather on the counter-shaft 25 between the two gear-wheels 37 and 38, is adapted to connect either wheel separately for rotation with the shaft or to break the rotative continuity between both gear-wheels and the shaft when it is desired to discontinue the operation of the machine without stopping the motor.

The sliding clutch is connected with a lever 40 which at one of its ends is fulcrumed upon a convenient part of the supporting structure as at 41, and which connects at its opposite end with a transversely disposed push-rod 42 loosely supported upon a bracket 43.

One end of the rod 42 is rounded as shown at 44 in Fig. 1, and bears against the face of a segmental cam 45 which is formed concentrically upon the gear wheel 27 on the upright shaft 29, and its opposite end is pivotally attached to the arm of a bell-crank 46 which is fulcrumed upon a bracket of the supporting structure as at 47.

A spring 48 attached to the bell-crank holds the push-rod yieldingly in contact with the cam face and a second spring 49 attached to the clutch-lever 40 is provided to maintain the lever in its coöperative position with relation to the transverse rod, the joint between which is established by a pin on one extending through a slot in the other.

In the operation of the transmission mechanism, the constantly rotating line shaft 23 imparts through the instrumentality of the change-speed gearing, the beveled gears 26 and 27 and the crank connections 30 and 31, a reciprocating movement to the carriage upon which the meat is supported.

During the effective movement of the carriage toward the cutting appliance of the machine, the rounded end 44 of the push-rod is disengaged from the segmental cam face and the clutch 39 is held in engagement with the gear wheel 38 by the springs 48 and 49 and thereby transmits the movement of the line shaft to the counter-shaft at an increased rate of speed.

When the carriage reaches the end of its forward movement, the segmental cam moves into engagement with the rounded end of the push-rod and thereby moves the latter outwardly against the action of the spring 48 on the bell crank.

The outward movement of the push-rod shifts the clutch 39 by means of the lever 40, from engagement with the gear-wheel 38 into interlocking contact with the gear wheel 37, with the result that during the subsequent return movement of the carriage the shaft is rotated at a considerably increased velocity, which in the construction shown in the drawings, is approximately equal to the speed of the line-shaft.

To prevent possible breakage or incapacitation of the operating parts of the machine when by the presence of obstructive matter, or other cause, the mechanism is subjected to more than ordinary stress, I have provided means to automatically discontinue the movement of the carriage, by shifting the clutch 39 to a neutral position in which it is free from contact with both the gears between which it has its movement.

The automatic means above referred to consist of a vertically disposed lever 50 which is fulcrumed to a part of the supporting structure, as at 51, and which connects at its upper end with the arm of the bell-crank 46 opposite to that to which the push-rod 42 is attached.

The lower arm of the lever 50 carries a small sprocket-wheel 52 which by means of a spring 125 is held in engagement with the sprocket-chain 24 which transmits the rotary movement of the motor-armature to the line shaft.

The spring on the bell crank compels the sprocket-wheel on the lever to exert a pressure on the chain and to thereby take up its slack as illustrated in Figs. 2 and 7 of the drawings.

When by an increased resistance to the power transmitting action of the shaft 23, the chain is tensioned, the consequent movement of the vertical lever 50 about its fulcrum will cause the bell-crank to turn against the action of its spring and through the medium of the push-rod move the clutch-lever 40 to a position in which the clutch 49 is placed neutrally between the two gear-wheels 37 and 38.

The movement of the shaft 25 and the carriage 3 is in consequence discontinued until the stress upon the operating mechanism has been relieved and the rotary parts thereof have resumed their normal movement when the spring 49 returns the clutch automatically to its previous operative position and the movement of the carriage is continued.

After the carriage has completed each forward movement during which a slice of meat is severed from a piece secured by the clamps 7 and 8, the joint must necessarily be moved transverse to the direction of the movement of the carriage, a distance equal to the desired thickness of the slices into which it is divided, before the carriage commences its next forward movement and the meat is again brought into engagement with the cutting appliance of the machine.

This transverse movement of the joint is in the operation of the apparatus automatically accomplished by a mechanism which periodically imparts a rotary movement to one of the feed screws 10 upon which the hereinbefore described meat-clamp 8 is supported.

This feeding mechanism consists of a sleeve 53 slidably mounted upon the end of one of the feed-screws which projects beyond a side of the supporting structure as best shown in Fig. 1.

A feather connects the sleeve for rotation with the feed-screw upon which it is mounted, and a hand lever 54 is connected with the sleeve for moving it along the shaft when it is desired to return the clamp to its original position as will hereinafter be more fully described.

The sleeve is provided with two reversely disposed beveled gear wheels 55 and 56 one of which engages a corresponding gear wheel 57 at the end of an obliquely disposed shaft 58. This shaft is at its upper end rotatably mounted in a bearing on a yoke 59 which is pivotally suspended from the sleeve 53 and the lower end of the shaft extends slidingly through a box 60 which is rotatably supported upon a projecting end of the before-mentioned counter-shaft 25.

A beveled gear-wheel 61 loosely mounted upon the oblique shaft 58 meshes with a corresponding gear wheel 62 on the counter-shaft 25 and is adapted to be interlockingly engaged by a clutch 63 which is slidably mounted on the shaft 58.

The shaft 58 has a longitudinal groove or guideway 64 to receive a key 65 which is fixed on the clutch 63 to compel it to rotate with the shaft, and a stop 66 fixed in the key-way is provided to separate the clutch from its correlative on the gear-wheel 61 at a determinate point in the oscillating movement of the shaft as will hereinafter be more fully described.

A latch 67 pivoted on the box 60 in which the oblique shaft is slidably supported, carries a stop 68 to engage a flange on the clutch and thereby hold it from engaging its correlative on the beveled gear-wheel 61, against the action of two coiled springs 69 which connect the clutch with the box 60 and tend to draw it into engagement with the gear 61.

A spring 70 connecting the box with the end of the latch opposite to that which carries the stop 68, is provided to normally hold the latch in its movement-obstructing position as shown in Fig. 2 of the drawings.

The latch 67 is attached at the end of a bar 71 which is hinged as at 72 on the supporting structure and which carries an upwardly projecting trip 73 disposed to be engaged by a dog 74 on the carriage 2 for the purpose of moving the bar upon its hinge and thereby adjust the latch to disengage its stop from the clutch 63.

The trip 73 is adjustably mounted on the bar by the use of a screw 75 which is provided with a hand-wheel to facilitate its rotation. By means of this screw the position of the trip with relation to the stationary structure of the machine may be varied within certain limits and the point in the movement of the carriage at which the bar is lifted may thereby be accurately regulated.

In order to move the bar about its hinge only during the return movement of the carriage, the pivoted dog is mounted on the carriage with relation to a relatively stationary abutment 76 so that when in the return movement of the carriage it is brought in contact with the trip, it is held rigidly in its suspended position, while during movement of the carriage in the opposite direction it is permitted to move about its pivot and thereby pass across the trip without affecting the position of the bar 71.

During the forward movement of the carriage toward the cutting appliance, the obliquely disposed shaft 58 moves toward the perpendicular by a sliding movement in the box 60 which is pivotally supported upon the end of the countershaft 25, the stop on the latch 67 holds the clutch from engagement with the gear-wheel, and the beveled gear-wheel 62 on the counter-shaft runs in consequence idly without imparting its movement to the shaft 58 as is required for the rotation of the feed-screw with which the shaft is connected by means of the beveled gears 57 and 55.

When during the return movement of the carriage the dog 74 engages the trip 73 on the bar 71, the latter is lifted and in consequence moves the latch 67 about its pivot whereby the stop 68 is disengaged from the clutch 63. The latter being now free to move along the shaft, is drawn into engagement with its correlative on the beveled gear 61 by the action of the springs 69 and thereby secures the rotative continuity between the gear and the shaft upon which it is mounted, with the result that a rotary movement is imparted to the two feed-screws which are connected to move in unison by the cross-shaft 13.

The clamp 8 is by the rotation of the feed-screws moved in a direction transverse to the movement of the carriage and thereby advances the meat held by the clamp and supported upon the belt 15.

As the carriage approaches the end of its return movement, the dog 74 by disengaging the trip 73 causes the bar to reassume its normal position, and the stop 66 in the key-way on the longitudinally sliding shaft 58 subsequently moves the clutch 63 out of engagement with the gear wheel 61 by engagement with its key 65.

The latch 67 and the clutch are in consequence returned to their former relative positions in which the one obstructs the movement of the other and the meat having been advanced on the carriage, is again held in place thereon for engagement with the cutting appliance during the next forward movement of the carriage.

It will be seen that during the movement of the clamp 8 by rotation of the feed-screws the belt is advanced to follow the movement of the clamp, by the rotary movement of the toothed wheels 14 on the cross shaft 13, which mesh with the fabric of the belt.

The period during which the clamp and belt are advanced by the operation of the feed-mechanism, determines the thickness of the slices which are severed from the joint by action of the cutting element during the forward movement of the carriage, and inasmuch as the duration of this movement of the clamp and belt is dependent on the point in the movement of the carriage at which the dog 74 engages the trip on the bar 71, it will be readily understood that by adjustment of the trip along the screw 75, the thickness of the slices into which the meat is to be divided, can be determined with absolute accuracy.

The clamp 7 which coöperates with the movable clamp 8 to secure a piece of meat on the carriage during the slicing action of the cutting element, consists of a chain 77 made of a plurality of pivoted links and connected between two posts 78 placed at opposite sides of the carriage.

It is obviously necessary that the auxiliary clamp 7 which occupies a fixed position with relation to the carriage, be adjusted to release the meat prior to its movement with the clamp 8 and the belt 15 of the feed mechanism.

To produce this result automatically, I secure the posts 78 to which the ends of the chain 77 are attached, upon the extremities of a bifurcated arm 79 of a lever which at 80 is fulcrumed upon a bracket on the under side of the carriage.

The opposite arm 81 of the lever is bent downwardly and is at its lower extremity pivotally attached to the end of one of two pivotally connected members 82 and 83 of a folding bar the other member of which is at its free end loosely suspended from a pin 84 on the supporting structure of the machine.

The last-mentioned member has in its end at which it connects with the stationary structure, a longitudinal slot 85 through which the pin 84 loosely extends.

One side of this slot is formed by a latch 86 pivoted on the member 83 and having adjacent its free extremity a nose 87 which when the latch is in its closed position, projects into the slot to lock the member of the bar in which the slot is formed, from lengthwise movement across the pin 84.

A coiled spring 88 between the ends of the latch and the member of the folding bar with which it is connected, is provided to yieldingly hold the latch in its normal closed position with relation to said member.

The arm 81 of the lever to which the folding bar is pivotally secured, has a laterally projecting finger 89 adapted to engage an extension on the free end of the latch 86 for the purpose of moving it against the action of its spring, to an open position in which the nose 87 extends outside the slot 85.

A coiled spring 90 connecting the arm 81 of the lever with a fixed fastening on the carriage, has been provided to forcibly hold the chain 47 in contact with the meat, it being understood that the links of which the chain is composed naturally arrange themselves in conformity with the shape of the same.

Premising that the slotted member 83 of the folding bar is normally free to move lengthwise across the pin on the supporting structure, it will be seen that during forward movement of the carriage toward the cutting element, the bar will gradually straighten while the slotted end of the member thereof rides longitudinally across the pin 84.

When the carriage has reached the end of its forward action after a slice has been severed from the meat by the action of the cutting element, the pin 84 by engagement with the slanting edge of the nose on the latch 86, forces the latter momentarily outwardly against the action of its spring, and enters the space between said nose and the end of the slot 85.

The member 83 of the folding bar is in consequence locked against further longitudinal movement across the pin during the return movement of the carriage, and the member 82 of the bar as it assumes a position in alinement with the downwardly bent portion of the lever-arm 81, forces the lever to move about its fulcrum against the action of the spring 90 and thereby lifts the chain 77 of the clamp 7 from engagement with the meat.

The meat supported upon the belt and held by the clamp 8 is thus free to move with these parts during the operation of the feed mechanism until after the stop 66 on the shaft 58 has moved the clutch 63 to its normal inoperative position and the feeding operation is in consequence discontinued, when by engagement of the finger 89 with the projection of the latch 86 the pin 84 is released and the parts are returned to their normal position by the action of the spring 90.

The cutting appliance of the machine hereinbefore repeatedly referred to, consists of two circular knives 91 which cooperate to sever the meat around the bone, and a saw 92 which cuts through the bone and thus completes the slicing operation.

The two knives are mounted to move jointly and separately about parallel pivotal axes to permit of their passing respectively above and below a bone in a joint of meat, irrespective of the elevation of the bone above the surface of the belt upon which the joint is supported, the knives being partially incased in sheaths 93 which effect their separative movement and also protect their cutting edges from coming in contact with the bone.

The circular saw of the cutting element is mounted upon an end of a horizontal shaft 94 which is rotatably supported in bearings 95 on the supporting structure of the machine.

The saw shaft also carries a sprocket wheel 96 which by means of a chain 97 is connected with a similar wheel 98 of larger diameter on the line shaft 23.

The knives of the cutting element are carried on a yoke 99 which is mounted for oscillation upon the shaft of the saw and which supports in suitable bearings a counter-shaft 100 which by means of gear wheels 101 and 102 is connected to move in unison with the saw-shaft.

An oil-tight casing in which the operating parts of the cutting appliance are inclosed, consists of a stationary part 103 which incloses the gear wheels 101 and 102, and two movable parts 104 which support the knives and contain the gears by which they are rotated in the operation of the machine.

The movable parts of the casing each consist of a hollow hub 107 which by means of a tubular stem 105 is connected with a hollow head 106. The hubs are movably mounted upon the shaft at opposite sides of the stationary part of the casing, with which they are connected by oil-tight joints, as shown at 108 in Fig. 5.

Sleeves 109 loosely surrounding the portions of the countershaft 100 within the hubs, provide thrust bearings for shafts 110 which extend through the tubular stems of the movable casing parts and are rotatably supported in bearings at the ends thereof.

Beveled gear wheels 112 within the hubs 107 mesh with corresponding wheels 113 fixed on the shaft 100 at opposite sides of the gear wheel 101, and beveled gear-wheels 114 at the opposite ends of the shafts 110 within the heads 106 of the movable casing parts, are in operative engagement with similar gear-wheels 115 on the knife-shafts 116 which are rotatably supported in bearings on the head transversely with relation to the respective movement-transmitting shafts 110.

The knife-shaft on one of the casing-parts extends underneath the head on the other part so that the circular knives which are rigidly mounted upon corresponding ends of the two transverse shafts 116 are disposed in substantially vertical alinement with relation to each other.

The two movable parts of the casing on which the knives together with their operating mechanisms are supported, extend respectively above and below the yoke 99 on which they are mounted and they are connected for synchronous movement in opposite directions by an equalizing bar 117 which is fulcrumed on the yoke and which at its ends is pivotally attached to the two pivoted casing-parts.

The knives are, as mentioned hereinbefore, partially incased in the guard sheaths 93 which are open at their ends forward with relation to the position of the saw and the movement of the carriage to expose the cutting edges of the knives for contact with the meat carried on the carriage, to forward movement thereof.

The sheath-like guards rest one upon the other and extend forward of the point of their tangential engagement so that a bone approaching the space between the peripheral edges of the knives at their point of nearest approach, will by contact with the guards, separate the knives and pass between them toward the saw without coming in contact with their cutting edges.

The saw extends in close proximity to the outer surfaces of the two sheaths which are offset as shown at 118 in Figs. 2 and 5, to cover the peripheral edge of the saw and thereby prevent its contact with the meat when the guards are in their normal position in which they engage each other.

A guard 119 incasing the edge of the saw at the rear end of the machine, serves as a protection against accidents.

While the movement of the carriage may be discontinued at any time by adjustment of the clutch 33 by the hand-lever 34, it is desirable that means be provided whereby the operation of the machine is automatically discontinued after the meat has been fed a predetermined distance across the carriage which moves it into engagement with the cutting element.

I provide to this end, an electric circuit-breaker 120 which is connected in the circuit of the motor as shown in Fig. 1 and which is operatively engaged by a shaft 121 rotatably supported at the end of the supporting structure rearward with relation to the movement of the carriage.

The shaft carries a double-pointed tappet 122, and the feed-clamp 8 has an arm 123 which by engagement with the tappet imparts a partial rotation to the shaft and thereby operates the switch 120.

The tappet is slidably mounted on the shaft and held in position by a set-screw so that the period in the movement of the feed-clamp across the carriage at which it is desired to discontinue the operation of the machine, may be varied in accordance with the size of the joint of meat or the portion thereof which is to be sliced.

When the clamp 8 has reached a position opposite to the tappet on the shaft, it engages the same at the beginning of the next forward movement of the carriage and thereby operates the switch to open the circuit of the motor which normally is closed therein.

In the operation of my improved meat-cutting machine, the joint of meat to be sliced is placed upon the belt after the clamp 8 has been moved to a position at the end of the carriage, corresponding with the side of the machine at which the cutting element is disposed. The meat is firmly secured in position by proper adjustment of the two clamps, the feed-clamp 8 to which the belt 15 is attached is advanced until the forward end-portion of the meat intersects the plane of the cutting edges of the two knives of the cutting appliance, and the trip 73 of the feed-mechanism is adjusted by rotation of the screw upon which it is mounted, according to the thickness of the slices to be cut off the meat.

The apparatus is now in a condition for slicing the entire joint of meat or any portion thereof and after the motor-circuit, which in the drawings has been designated by the lines 124, has been closed by adjustment of the switch 120, requires no further attention other than the adjustment of the clutch 33 to discontinue the operation of the moving parts, or the readjustment of the switch when the services of the machine are no longer required.

The lever 50 which engages the sprocket-chain of the motor and operates the clutch 39 on the counter-shaft 25, automatically discontinues the operation of the machine in case of an overload caused by an obstruction or breakage, the spring 49 on the clutch-lever automatically returns it to its operative position to resume the operation of the machine after the obstruction has been removed or the broken part has been replaced, and by adjustment of the tappet on the shaft 121 the operation of the machine may be automatically discontinued after the desired portion of the meat on the carriage has been sliced by action of the cutting appliance.

The forwardly moving carriage carries the meat into engagement with the exposed forward portions of the knives 91 which in consequence cut through the meat and toward the bone of the joint.

When the bone engages the forward edge of one of the sheaths in which the knives are inclosed, the yoke 99 is moved about the shaft of the saw on which it is supported, until the bone is opposite to the point at which the guards engage, when by further forward movement of the carriage, it separates the knives by moving the pivoted parts of the casing upon the counter-shaft 100.

The bone now passes between the knives without coming in contact with the cutting edges thereof and engages the saw while the knives continue their cutting action upon the meat around the bone.

After the bone has been cut by the action of the saw, the knives during continued forward movement of the carriage complete the cutting action by which a slice is severed from the meat, after which the carriage is returned to its original position at an increased velocity by the engagement of the rod 42 with the cam-face 45 on the gear-wheel 27 and the consequent reversal of the position of the clutch 39 with relation to the two members of the transmission between which it is disposed.

During the return movement of the carriage, the clamp 7 is disengaged from the meat by the action of the folding bar upon the lever upon which the clamp is supported, after the slotted member of the bar has been locked against longitudinal movement across the pin 84 on the supporting structure, by the spring-held latch 86.

When the carriage reaches a position in which its dog 74 engages the trip 73, the consequent upward movement of the bar 71 releases the clutch 63 which is moved into engagement with the gear-wheel 61 and thereby causes the shaft 58 to rotate in unison with the counter-shaft 25.

The rotary movement of the shaft 58 imparts a like movement to the two feed screws which rotate in unison through the instrumentality of the cross-shaft 13, until the stop 66 on the shaft 58 which constantly moves longitudinally through its bearings on the box 60, engages the key 65 of the clutch 63 and lifts the latter free from engagement with the gear wheel to resume its original position in which it is locked by the latch 67.

Before the carriage reaches the end of its return motion the clamp 7 has been returned to its clamping position by the action of the spring 90 when by contact of the finger 89 on the lever-arm 81 with the projection of the latch on the member 83 of the folding bar, the latch is released from contact with the pin 84.

The cam on the gear-wheel 27 at the same time disengages the rounded end of the push bar 42 and the position of the clutch 39 is in consequence reversed to effect the next forward movement of the carriage at the original slow rate of speed.

After the entire joint of meat, or the desired portion thereof, has been sliced, the feed-clamp 8 and the belt 15 with which it is connected, are returned to their original position by reversing the movement of the feed-screws which is readily accomplished by sliding the sleeve 53 by means of the lever 54 until the gear 56 which normally is disengaged from the gear-wheel 57 on the oblique shaft, is brought into engagement therewith.

During the return movement of the clamp, the tension-roller 17 rewinds the belt which is fed thereonto by the rotary sprocket wheels 14 on the cross-shaft 13.

Having thus described my improved cutting machine in the best form at present known to me I desire it understood that variations in the construction and relative arrangement of its parts may be resorted to within the spirit of my invention as defined in the following claims:

1. In a meat-cutting machine, a reciprocating element, a driving element, and a transmission between said elements, including a driven-shaft, change-speed gearing comprising members normally loose on said shaft, a clutch to secure the rotative continuity of either gear with the shaft, and mechanism to automatically shift the clutch to alternately engage said members at the ends of the forward and return movements of the reciprocating element.

2. In a meat-cutting machine, a reciprocating element, a driving element, and a transmission between said elements, including a driven shaft, change-speed gearing comprising members normally loose on said shaft, a clutch to secure the rotative continuity of either gear with the shaft, a spring-controlled device to shift the clutch, and a rotary cam acting upon said device to vary its position at the ends of the forward and return movements of the reciprocating element, whereby to shift the clutch to alternately engage said members.

3. In a meat-cutting machine, a reciprocating element, a driving element, and a transmission between said elements, including a crank-movement and a change-speed gearing to automatically change the velocity of the reciprocating element at the ends of its forward and return movements.

4. In a meat-cutting machine, a reciprocating element, a driving element, and a transmission between said elements, including a shiftable clutch to break and secure the motion-transmitting connection between said elements, a driving-chain connected with said driving element, and a lever engaging said chain and operatively connected with the clutch to move it to an idle position when the chain is tensioned by an excess of resistance to the movement of the driving element.

5. In a meat-cutting machine, a cutting-appliance, a carriage to carry a joint of meat into engagement therewith, and means for advancing a joint of meat on said carriage, including a clamp to hold the meat, a belt to support the same, and means to effect a conjunctive movement of said clamp and said belt at a determinate period in the movement of the carriage.

6. In a meat-cutting machine, a cutting-appliance, a carriage to carry a joint of meat into engagement therewith, and means for advancing a joint of meat on said carriage, including a clamp to hold the meat, a belt to support the same, and means to automatically effect a conjunctive movement of said clamp and said belt to advance the meat a predetermined distance, at a determinate period in the movement of the carriage.

7. In a meat-cutting machine, a cutting-appliance, a carriage to carry a joint of meat into engagement therewith, and means for advancing a joint of meat on said carriage, including a clamp to hold the meat, a belt to support the same, a tension-roller upon which the belt is partially wound, and means to effect a conjunctive movement of said clamp and said belt at a determinate period in the movement of the carriage.

8. In a meat-cutting machine, a cutting-appliance, a carriage to carry a joint of meat into engagement therewith, a meat-support mounted to advance a joint of meat on the carriage, and coöperative mechanism to operate the carriage, and to advance the meat-support a predetermined distance on the carriage at a determinate period in the movement thereof.

9. In a meat-cutting machine, a cutting-appliance, a carriage to carry a joint of meat into engagement therewith, a feed-screw on said carriage, a meat-support in operative connection with said screw, and including a clamp to hold the meat and a belt to support the same, a device operating in unison with said feed-screw to compel the belt to move conjointly with the clamp, and coöperative mechanisms to operate the carriage and to advance the meat-support a predetermined distance by rotation of said screw at a determinate period in the movement of the carriage.

10. In a meat-cutting machine, a cutting-appliance, a carriage to carry a joint of meat into engagement therewith, a feed-screw on said carriage, a meat-support in operative connection with said screw, mechanism to operate the carriage, including a rotary element, and feed mechanism coöperative with said carriage-operating mechanism to advance the meat-support a predetermined distance by rotation of said screw at a determinate period in the movement of the carriage, including a rotary shaft in operative connection with said feed-screw, a normally idle transmission member for rotating said shaft by movement of said element, said shaft being mounted to follow the movement of the carriage, a clutch adapted to secure and break the rotative continuity of said shaft and said transmission-member, a latch normally holding said clutch in an idle position, and means to release said clutch by adjustment of the latch at a determinate period in the movement of the carriage.

11. In a meat-cutting machine, a cutting-appliance, a carriage to carry a joint of meat into engagement therewith, a feed-screw on said carriage, a meat-support in operative connection with said screw, mechanism to operate the carriage, including a rotary element, and feed-mechanism coöperative with said carriage-operating mechanism to advance the meat-support a predetermined distance by rotation of said screw at a determinate period in the movement of the carriage, including a rotary shaft in operative connection with said feed-screw, a normally idle transmission-member for rotating said shaft by movement of said element, said shaft being mounted to follow the movement of the carriage, a clutch adapted to secure and break the rotative continuity of said shaft and said transmission-member, a latch normally holding said clutch in an idle position, means to release said clutch by adjustment of the latch at a determinate period in the movement of the carriage, and means to automatically return the clutch to its idle position at a subsequent moment in the movement of the carriage.

12. In a meat-cutting machine, a cutting appliance, a carriage to carry a joint of meat into engagement therewith, a feed-screw on said carriage, a meat-support in operative connection with said screw, mechanism to operate the carriage including a rotary element, and feed-mechanism coöperative with said carriage-operating mechanism to advance the meat-support a predetermined distance by rotation of said screw at a determinate period in the movement of the carriage, including a rotary shaft in operative connection with said feed-screw, a normally idle transmission member for rotating said shaft by movement of said element, said shaft being mounted to follow the movement of the carriage, a clutch adapted to secure and break the rotative continuity of said shaft and said transmission-member, a latch normally holding said clutch in an idle position, means to release said clutch by adjustment of the latch at a determinate period in the movement of the carriage, including a trip, and a dog on the carriage to engage the trip for the operation of said means.

13. In a meat-cutting machine, a cutting-appliance, a carriage to carry a joint of meat into engagement therewith, a feed-screw on said carriage, a meat-support in operative connection with said screw, mechanism to operate the carriage, including a rotary element, and feed mechanism coöperative with said carriage-operating mechanism, to advance the meat-support a predetermined distance by rotation of said screw at a determinate period in the movement of the carriage, including a rotary shaft in operative connection with said feed-screw, a normally idle transmission member for rotating said shaft by movement of said element, said shaft being mounted to follow the movement of the carriage, a clutch adapted to secure and break the rotative continuity of said shaft and said transmission-member, a latch normally holding said clutch in an idle position, means to release said clutch by adjustment of the latch at a determinate period in the movement of the carriage, including a trip, adjustable in a direction parallel to the movement of the carriage, and a dog on the carriage to engage the trip for the operation of said means.

14. In a meat-cutting machine, a cutting-appliance, a carriage to carry a joint of meat into engagement therewith, a feed-screw on said carriage, a meat-support in operative connection with said screw, mechanism to operate the carriage, including a rotary element, and feed-mechanism coöperative with said carriage-operating mechanism, to advance the meat-support a predetermined distance by rotation of said screw at a determinate period in the movement of the carriage, including a rotary shaft in operative connection with said feed-screw, a normally idle transmission-member for rotating said shaft by movement of said element, said shaft being mounted to follow the movement of the carriage, a clutch adapted to secure and break the rotative continuity of said shaft and said transmission-member, a latch normally holding said clutch in an idle position, means to release said clutch by adjustment of the latch at a determinate period in the movement of the carriage, including a hinged bar, a trip thereon, a screw to adjust the trip in a direction parallel to the movement of the carriage, and a dog on the carriage to engage the trip for the operation of said means.

15. In a meat-cutting machine, a cutting-appliance, a carriage for carrying a joint of meat into engagement therewith, a meat support mounted to advance a joint of meat on the carriage, a clamp for securing a joint of meat on said support, coöperative mechanisms to operate the carriage and to automatically advance the support a predetermined distance at a determinate period in the movement thereof, and means for the automatic adjustment of the clamp to release the meat for movement with said support.

16. In a meat-cutting machine, a cutting appliance, a carriage for carrying a joint of meat into engagement therewith, a meat support mounted to advance a joint of meat on the carriage, a clamp for securing a joint of meat on said support, coöperative mechanisms to operate the carriage and to automatically advance the support a predetermined distance at a determinate period in the movement thereof, and means for the automatic adjustment of the clamp to release the meat for movement with said support, including a lever mounted on the carriage in connection with the clamp, a spring to hold the clamp in its meat-securing position, and means to mechanically change the position of said lever to release the meat for movement with the support, by adjustment of the clamp.

17. In a meat-cutting machine, the combination with a supporting frame, of a cutting appliance, a reciprocating carriage for carrying a joint of meat into engagement therewith, a meat support mounted to advance a joint of meat on the carriage, a clamp for securing a joint of meat on said support, coöperative mechanisms to operate the carriage and to automatically advance the support a predetermined distance at a determinate period in the movement thereof, and means for the automatic adjustment of the clamp to release the meat for movement with said support, including a lever mounted on the carriage in connection with the clamp, a spring to hold the clamp in its meat-securing position, a folding bar connecting the lever to said frame, said bar having a longitudinal movement relative to the point of its connection with the frame, during movement of the carriage in one direction, and a device to automatically lock the bar against longitudinal movement with relation to said point during opposite movement of the carriage whereby to compel it to change the position of the lever to release the meat for movement with the support, by adjustment of the clamp.

18. In a meat-cutting machine, a cutting appliance, a carriage for carrying a joint of meat into engagement therewith, and a clamp for securing a joint of meat on the carriage, including a chain adapted for self-adjustment to conform with the contour of the meat.

19. In a meat-cutting machine, a cutting appliance, a carriage for carrying a joint of meat into engagement therewith, a meat-support mounted to advance a joint of meat on the carriage, mechanisms to operate the carriage and to feed the meat-support a predetermined distance at a determinate period in the movement thereof, and adjustable means to automatically discontinue the operation of said mechanisms at a selected point in the movement of the support.

20. In a meat-cutting machine, a cutting appliance, a carriage for carrying a joint of meat into engagement therewith, a meat support mounted to advance a joint of meat on the carriage, mechanisms to operate the carriage and to feed the meat-support a predetermined distance at a determinate period in the movement thereof, an electric motor for the operation of said mechanisms, and a switch controlling the flow of current to said motor, including an actuating member connected for movement with the meat-support, and an actuated member disposed in the path of the other member.

21. In a meat-cutting machine, a cutting appliance, a carriage for carrying a joint of meat into engagement therewith, a meat-support mounted to advance a joint of meat on the carriage, mechanisms to operate the carriage and to feed the meat-support a predetermined distance at a determinate period in the movement thereof, an electric motor for the operation of said mechanisms, and a switch controlling the flow of current to said motor, including an actuating member connected for movement with the meat-support, and an actuated member adjustably disposed in the path of the other member.

22. In a meat-cutting machine, a reciprocating element, a driving element, a transmission between said elements, including a shiftable clutch, a chain for transmitting the movement of said driving element to the cutting-appliance, a lever for moving said clutch, and means for holding an end of said lever yieldingly in engagement with said chain, whereby the clutch is moved to an inoperative position when by excess resistance to the movement of the driving element, the chain is tensioned.

23. In a meat-cutting machine, a cutting appliance, a carriage for carrying a joint of meat into engagement therewith, a meat-support mounted to advance a joint of meat on the carriage, a driving element, mechanism for transmitting the movement of said element to said carriage, means in connection with said element, for the operation of the cutting-appliance, and mechanism operated by connection with said element to feed the meat-support a predetermined distance at a determinate point in the movement of the carriage.

24. In a meat-cutting machine, a cutting appliance, a carriage for carrying a joint of meat into engagement therewith, a meat-support mounted to advance a joint of meat on the carriage, a driving element, mechanism for transmitting the movement of said element to said carriage, means in connection with said element, for the operation of the cutting-appliance, mechanism operated by connection with said element, to feed the meat-support a predetermined distance at a determinate point in the movement of the carriage, and means for reversing the movement of the feed-mechanism to return the meat-support to its original position.

25. In a meat-cutting machine, a cutting-appliance, a carriage for carrying a joint of meat into engagement therewith, a meat-support mounted to advance a joint of meat on the carriage, a driving element, mechanism for transmitting the movement of said element to said carriage, means in connection with said element for the operation of the cutting-appliance, mechanism operated by connection with said element, to feed the meat-support a predetermined distance at a determinate point in the movement of the carriage, and means to automatically discontinue the operation of said mechanisms at a determinate point in the movement of the meat-support.

26. In a meat-cutting machine, a rotary saw, a rearwardly extending yoke mounted to move about the axis of rotation thereof, a rotary countershaft on the yoke in driven connection with the saw, carrying-members mounted to move about the axis of the counter-shaft, and extending forwardly and at opposite sides of the axis of the saw, rotary shafts supported on said members in driven connection with the counter shaft, knives mounted at the outer ends of said members for rotation about axes at right angles to those of said rotary shafts, and gearings for transmitting the movement of the last-mentioned shafts to the knives.

27. In a meat-cutting machine, a rotary saw, a rearwardly extending yoke mounted to move about the axis of rotation thereof, a rotary countershaft on the yoke in driven connection with the saw, a casing including a stationary member inclosing said connection between the saw and the counter-shaft, and two carrying-members in fluid-tight connection with the stationary part extending downwardly and at opposite sides of the axis of the saw and mounted to move about the axis of rotation of the counter-shaft, knives mounted on said carrying-members, and rotary shafts supported on the same members in operative connection with the counter-shaft and in driving connection with the knives.

28. In a meat-cutting machine, the combination with a meat-carrier, of mechanism for imparting a reciprocating movement to said carrier, including a change-speed gearing and a rotary element to automatically adjust said gearing at the ends of the movement of the carrier whereby to change the velocity thereof.

29. In a meat-cutting machine, the combination with a meat carrier, of mechanism for the operation of said carrier, including a change-speed gearing and a rotary element to automatically adjust the gearing at determinate periods in the movement of the carrier whereby to change the velocity thereof.

30. In a meat-cutting machine, a reciprocating element, a driving element, mechanism in connection with said driving element, for the operation of the reciprocating element, including a change-speed gearing and a device to automatically adjust the gearing at determinate periods in the movement of the reciprocating element whereby to change the velocity thereof, and means to automatically place said gearing in an idle condition by an excess of resistance to the movement of said driving element.

31. In a meat-cutting machine, a reciprocating element, a driving element, mechanism in connection with said driving element, for the operation of the reciprocating element, including a change-speed gearing, a shiftable clutch coöperative with said gearing, a device for the automatic operation of said clutch at determinate periods in the movement of the reciprocating element for the adjustment of the gearing whereby to change the velocity of said element, and means to automatically place the clutch in a neutral position with relation to the gearing, by an excess of resistance to the movement of said driving element.

32. In a meat-cutting machine, a pair of separably mounted rotary knives whose cutting edges adjoin to sever a piece of meat passing between them, and guards covering the cutting edges of the knives at their point of nearest approach to prevent said edges from engaging at said point an object passing between the knives.

33. In a meat-cutting machine, a pair of separably mounted rotary knives whose cutting edges adjoin to sever a piece of meat passing between them, and tangentially engaging guards covering the cutting edges of the knives at their point of nearest approach to prevent said edges from engaging at said point an object passing between the knives.

34. In a meat-cutting machine, a pair of separably mounted rotary knives whose cutting edges adjoin to sever a piece of meat passing between them, and guards covering the cutting edges of the knives at their point of nearest approach and rearward thereof to prevent said edges from engaging at said point an object passing between the knives.

35. In a meat-cutting machine, a rotary saw, a yoke mounted to move bodily about the axis of rotation thereof, a rotary counter shaft on the yoke in driven connection with the saw, rotary knives whose cutting edges adjoin, and which have a planetary movement about the axes of said counter-shaft when separated by an object passing between them, and means for transmitting the rotary motion of the counter-shaft to said knives.

36. In a meat-cutting machine, a horizontally moving carriage, a superimposed meat-support to advance a joint of meat on the carriage in a plane parallel to its said movement, mechanism for the operation of the carriage, and mechanism coöperative with said operating mechanism to advance the meat-support a variable distance on the carriage at a determinate point in the movement thereof.

37. In a meat-cutting machine, a cutting-appliance, comprising a pair of rotary knives whose cutting-edges adjoin to coöperatively sever a piece of meat, said knives being mounted to move apart by the passage of an object between them, and said appliance being mounted to move bodily by the engagement of an object, to vary the position of the point of nearest approach of the knives with relation thereto, and an equalizer adapted to compel the knives to move in unison while moving apart.

38. In a meat-cutting machine, a cutting-appliance comprising a pair of rotary knives whose cutting edges adjoin to sever a piece of meat passing between them, said knives being mounted to move apart in a circular path by the passage of an object between them, and said appliance being mounted to move at the same time bodily in a circular path of smaller diameter by the engagement of an object, to vary the position of the point of nearest approach of the knives with relation thereto.

39. In a meat-cutting machine, a rotary saw, a rearwardly extending yoke having an oscillating movement about the axis of rotation thereof, rotary shafts supported on said yokes for divergent movement about a transverse axis thereon, and extending forwardly and at opposite sides of the axis of the saw, means for transmitting the rotary movement of the saw to said shafts, knives mounted at the outer ends of said shafts for movement about transverse axes, and means for transmitting the rotary movement of the shafts to the respective knives.

40. In a meat-cutting machine, a rotary saw, a rearwardly extending yoke having an oscillating movement about the axis of rotation thereof, rotary shafts supported on said yoke, and extending forwardly and at opposite sides of the axis of the saw, means for transmitting the rotary movement of the saw to said shafts, knives mounted at the outer ends of said shafts for movement about transverse axes, and means for transmitting the rotary movement of the shafts to the respective knives.

In testimony whereof I have affixed my signature in presence of two witnesses.

EARL M. BENTON.

Witnesses:
JOHN C. FLEMING,
R. E. GUTHRIDGE.